March 21, 1944.  J. M. OLASZY  2,344,520
AIRPLANE AIR BRAKE
Filed Sept. 9, 1940  2 Sheets-Sheet 1

INVENTOR
Joseph M. Olaszy
BY
ATTORNEY

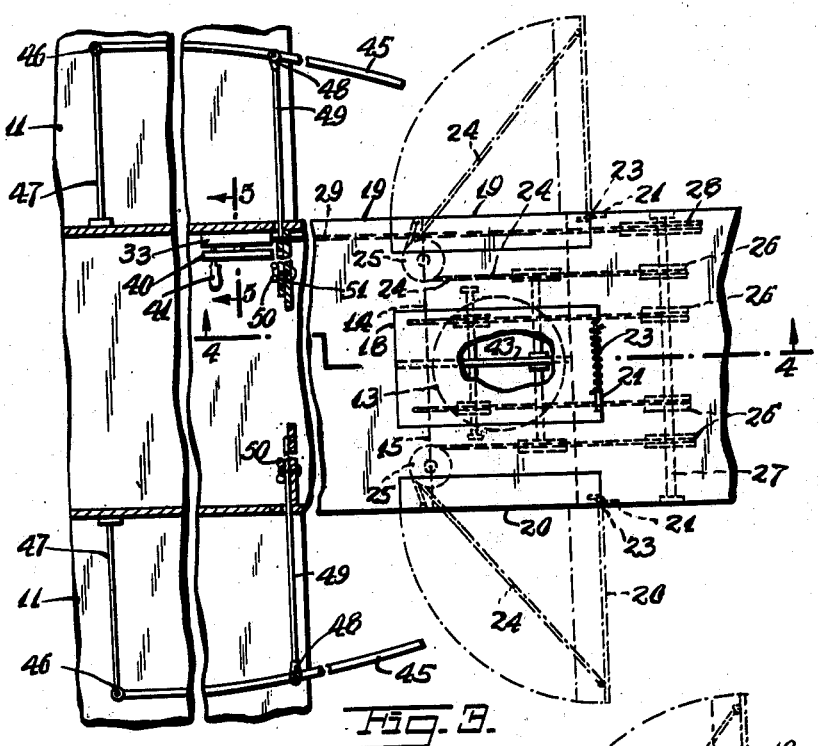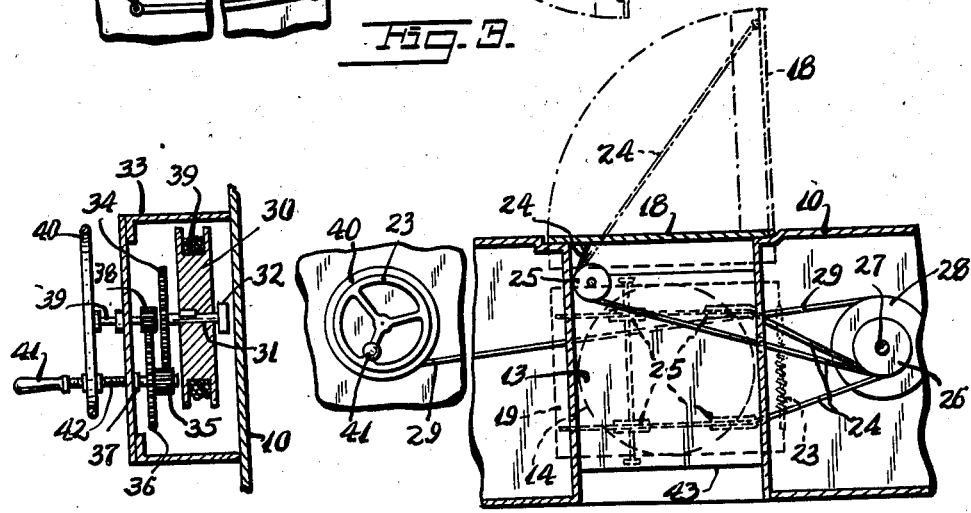

Patented Mar. 21, 1944

2,344,520

UNITED STATES PATENT OFFICE 2,344,520

AIRPLANE AIR BRAKE

Joseph M. Olaszy, Bronx, N. Y., assignor of twenty-five per cent to Joseph Varro, ten per cent to Franz Magyarits, and five per cent to Ernest Goldman, all of New York, N. Y.

Application September 9, 1940, Serial No. 355,959

2 Claims. (Cl. 244—113)

This invention relates to new and useful improvements in an airplane air brake and lifting device.

More particularly the invention proposes the construction of a device as mentioned, which is characterized by air passages arranged through the rear portion of the fuselage of an airplane and a novel arrangement of doors on the sides and the top of the fuselage for closing the ends of the passages, or for assisting in directing air through the passages. The invention also proposes that the doors, in their open position, be directed outwards substantially at right angles to the side and top of the fuselage so as to act as brake wings for reducing the speed of the airplane when so desired.

An important advantage obtained with the new construction resides in the fact that while the airplane is in flight the said doors may be immediately closed to increase the speed of flying, or the said doors may remain open if it is merely desired to stay afloat. The invention is also of great use in landing. When the doors are extended, the head-on speed of the plane will be materially reduced. This permits landing at low speeds.

Still further the invention proposes the provision of certain air guiding fins for directing a large quantity of air towards the doors and through the passage.

Still further the invention proposes the construction of a device as mentioned which is simple and durable and which may be manufactured and sold at reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a fragmentary enlarged plan view of Fig. 1.

Fig. 4 is a fragmentary vertical sectional view taken on the line 4—4 of Fig. 3.

Fig. 5 is a fragmentary enlarged vertical sectional view taken on the line 5—5 of Fig. 3.

Figure 1:
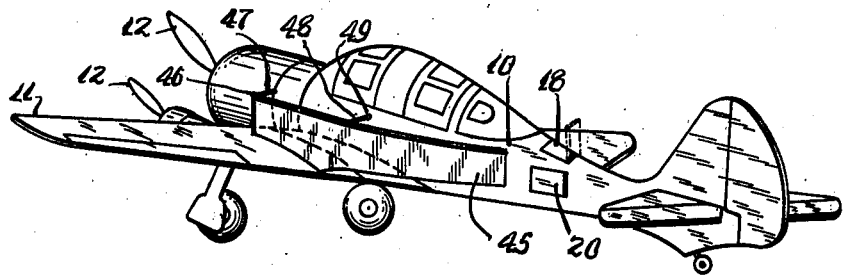
Fig. 1 is a perspective view of an airplane viewed from the rear, and constructed with an air brake and lifting device in accordance with this invention.

The airplane air brake and lifting device in accordance with this invention is applied to an airplane having a fuselage 10, wings 11, and propeller means 12 at its front. An air passage 13 extends vertically through the rear portion of the fuselage 10 and has side branches 14 and 15 connecting with the sides of the fuselage.

Figure 2:
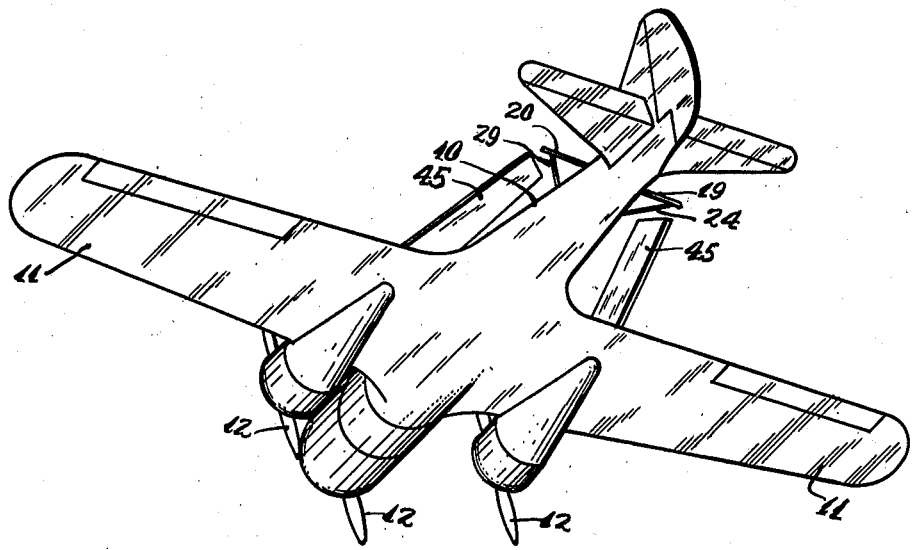
Fig. 2 is a perspective view of the airplane shown in Fig. 1 viewed from the bottom.

A top door 18 is provided for closing the top of the vertical passage 13. Side doors 19 and 20 close the outer ends of the side passages 14 and 15. These doors are hingedly supported by hinged constructions 21 at their rear ends upon portions of the fuselage of the rear of the passages 13, 14 and 15. The doors are so arranged that in their closed positions their outer faces are flush with the outer faces of the fuselage. In their open positions they extend at right angles to the faces of the fuselage as clearly shown in Figs. 2, 3 and 4.

The doors are associated with means by which they may be readily opened and closed. This means includes a spring 23 for each door, normally urging the door into an open position. Each spring 23 is arranged coaxially upon the hinge 21 of the door. The springs 23 act to normally urge the doors into their open positions, but normally they are opposed by restraining cables 24. These cables pass over guide means or pulleys 25 supported upon the fuselage near the front ends of the doors. The cables then extend rearwards and wind upon drums 26 which are mounted on an axle 27. The axle 27 is rotatively supported across the fuselage slightly rearwards of the doors. The axle 27 is provided with a main drum 28, upon which a cable 29 is wound. This cable 29 extends forwards to the front part of the airplane and winds around a drum 30 of a winding and letting out means.

The drum 30 is keyed upon a shaft 31 rotatively supported in a bearing 32 mounted within a transmission casing 33. A gear 34 is fixed coaxially upon the shaft 31 and meshes with a pinion 35 fixed coaxially with a gear 36 rotatively supported by the bearing 37. The gear 36 meshes with a pinion 38 upon a shaft 39 which extends to the exterior of the housing 35. This shaft 39 is provided with a wheel 40 having a handle 41 by which it may be conveniently turned. The handle 41 is mounted upon the outer end of a screw 42 which threadedly engages through the handle 40 and which is adapted to abut against the front face of the housing 33 for holding the wheel 40 in a fixed position.

A baffle plate 43 is vertically mounted along the longitudinal center of the air passage 13 so as to separate the side air passages 14 and 15. The air entering these side passages will contact the baffle plate 14 and then move downwards to join the current of air entering the top of the vertical passage 13.

An air guide fin 45 is mounted along each side of the fuselage, spaced slightly outwards of the fuselage and arranged to direct air rearwards against the side doors 19 and 20 when the latter are in their opened positions. Each fin 45 is pivotally supported at its front end upon a vertical pivot 46. These pivots are supported by brackets 47 mounted upon the sides of the fuselage. The fins 45 extend rearwards from the pivots 46. Links 48 pivotally connect with the fins 45 intermediate of their ends. These links 48 pivotally connect with holding bars 49 which are extended towards and into the sides of the fuselage 10.

Means is provided for holding each bar 49 in an adjusted position for fixedly holding the fins, as desired. As illustrated on the drawings the holding means for each bar 49 comprises a stationarily mounted screw and wing nut 50 which coact with a slot 51 formed in the bar. The wing nuts 50 may be loosened and then the bar moved inwards or outwards, and the wing nuts 50 may then be tightened to fix the bars in their new positions. This adjustment makes it possible to hold the fins 45 extended directly rearwards, or rearwards and slightly laterally inwards so as to cause the currents of air to flow in between the fins and the sides of the fuselage.

The operation of the device is as follows:

Assume the aeroplane is in the air and it is desired to land. The handle 41 is slightly turned so as to disengage the screw 42 from the housing 33. The wheel 40 is now free to turn. The handle 41 is moved to turn the wheel 40 so as to indirectly turn the drum 30 letting out the cable 29. This operation slackens the cables 24 so that the springs 23 open the doors 18, 19 and 20. The cable 29 is let out until the doors 18, 19 and 20 extend outwards at right angles to the fuselage 11, or at acute angles directed forwards, as decided upon by the pilot.

The wind created by the propellers will cause air currents to travel rearwards, guided by the fins 45 and impinged upon the doors 18, 19 and 20. The air currents will be deflected by the doors into the passage 13 and the branch passages 14 and 15.

The plane may be landed at low speeds and in quite a small field by first extending the doors 18, 19 and 20 as previously explained. The doors act as a brake to the headon speed of the plane. This allows landing at slow speeds and in short distances.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In an airplane having a fuselage formed adjacent its rear end with a vertical air passage having side passages disposed on each side of said fuselage, said passages communicating with said vertical passage, and doors for closing the outer ends of said vertical passage and said side passages, means pivotally mounting said doors on said fuselage at the back of the open ends of said passages, means for extending said doors at right angles from the back of said passages for catching and directing air currents passing rearwardly along said fuselage and into the open ends of said passages, a vertical fin mounted on each side of said fuselage for directing air currents passing rearwardly along said fuselage towards the doors which extend from the openings of said side passages, each of said fins extending from a point adjacent the propeller blades and in the path of the propeller blast to a point adjacent the open ends of said side passages, said mounting for said fins, comprising vertical pivot pins upon which the front ends of said fins are mounted, means supporting said pivot pins spaced from the sides of said fuselage and thereby maintaining said fins in a vertical plane in spaced relationship with respect to said fuselage, means for holding the rear edges of said fins adjustably spaced from the sides of said fuselage about the pivoted front ends, said latter means comprising bars having their outer ends pivotally attached to said fins intermediate of their ends, said bars having their inner ends slidably extended through the side walls of said fuselage and projected to the interior thereof, and manually adjustable means within said fuselage for holding said bars fixedly in various extended positions to hold said fins in various pivoted positions.

2. In an airplane having a fuselage formed adjacent its rear end with a vertical air passage having side passages disposed on each side of said fuselage, said passages communicating with said vertical passage, and doors for closing the outer ends of said vertical passage and said side passages, means pivotally mounting said doors on said fuselage at the back of the open ends of said passages, means for extending said doors at right angles from the back of said passages for catching and directing air currents passing rearwardly along said fuselage and into the open ends of said passages, a vertical fin mounted on each side of said fuselage for directing air currents passing rearwardly along said fuselage towards the doors which extend from the openings of said side passages, each of said fins extending from a point adjacent the propeller blades and in the path of the propeller blast to a point adjacent the open ends of said side passages, said mounting for said fins comprising vertical pivot pins upon which the front ends of said fins are mounted, means supporting said pivot pins spaced from the sides of said fuselage and thereby maintaining said fins in a vertical plane in spaced relationship with respect to said fuselage, means for holding the rear edges of said fins adjustably spaced from the sides of said fuselage about the pivoted front ends, said latter means comprising bars having their outer ends pivotally attached to said fins intermediate of their ends, said bars having their inner ends slidably extended through the side walls of said fuselage and projected to the interior thereof, and manually adjustable means within said fuselage for holding said bars fixedly in various extended positions to hold said fins in various pivoted positions, said manually adjustable means comprising screws projecting from a stationary portion of said fuselage and freely projected through elongated horizontal slots formed in the inner ends of said bars, and wing nuts threadedly engaged on the free ends of said screws for clamping said bars securely against the adjacent face of said stationary portion when said nuts are tightened.

JOSEPH M. OLASZY.